Patented June 23, 1931

1,811,078

UNITED STATES PATENT OFFICE

HARRY B. DYKSTRA, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION CONTAINING POLYMERIZED DIVINYL BENZENE

No Drawing.    Application filed March 4, 1930.    Serial No. 433,178.

This invention relates to new compositions of matter. More particularly it relates to coating compositions containing polymerized divinyl benzene and a drying oil.

The previous study of polymerized vinyl compounds has shown that polymerized vinyl benzene (meta styrene) and polymerized chlorostyrene are both incompatible with drying oils. I have discovered, however, that in the case of polymerized divinyl benzene this is not true and that, although it is surprising in view of the incompatibility of polymerized meta styrene and polymerized chloro styrene with drying oils, polymerized divinyl benzene is compatible with raw drying oils, and when mixed therewith gives hard and tough finishes.

This invention has as an object the preparation of hard, tough, and water-resistant coating compositions. A further object of this invention is to prepare durable coating compositions containing polymerized divinyl benzene.

These objects are accomplished by using a mixture of polymerized divinyl benzene and a drying oil as the vehicle or principal film-forming constituent of the coating composition.

It has been found that divinyl beneze can be polymerized in much the same manner as styrene. It polymerizes within a few days on standing at room temperature, while in the presence of a small amount of stannic chloride, substantially complete polymerization occurs within a few hours, divinyl benzene also polymerizes on heating, especially in the presence of a substance like benzoyl peroxide.

I have found that polymers of divinyl benzene prepared by any of the methods described above have a gel-like structure and are practically insoluble in liquid solvents. In order to obtain soluble polymers suitable for use in coating compositions I have found it advantageous to polymerize the divinyl benzene in the presence of a solvent. The polymer can then be used directly in the solvent or can be separated by distillation, (preferably by steam) or by a process of precipitation consisting in pouring the solution into a non-solvent for the polymer.

Examples illustrating the preparation of polymerized divinyl benzene are as follows:

Example I

A mixture containing 100 parts divinyl benzene, 200 parts xylene, and two parts benzoyl peroxide was refluxed for four hours. The reaction mixture was then poured into about 1000 parts of alcohol which caused 50 parts of polymerized divinyl benzene to separate as a white powder. The polymer was readily soluble in esters and in aromatic hydrocarbons.

Example II

A solution containing 200 g. divinyl benzene, 400 g. toluene, and 4 g. benzoyl peroxide was refluxed for four hours and then steam distilled to separate the toluene and unpolymerized divinyl benzene from the polymerized material. The polymer obtained in this way weighed 58 g. and was readily soluble in esters and in aromatic hydrocarbons. The toluene solution of unpolymerized divinyl benzene obtained as a distillate was concentrated somewhat by removing a portion of the toluene, and was then heated for four hours with 3 g. of benzoyl peroxide. When this mixture was steam distilled as before, 52g. additional polymerized divinyl benzene was obtained.

Example III

A solution containing 100 parts divinyl benzene, 200 parts benzene, and 1 part stannic chloride was allowed to stand at room temperature (20–30° C.) for 12 hours. The solution was then poured into alcohol and the polymer separated as in Example I. The yield of polymer in this experiment was 80%. The polymer resembled that formed in Examples I and II in solubility behavior.

Films of polymerized divinyl benzene become brittle very rapidly even when they are softened with plasticizers such as dibutyl phthalate, tricresyl phosphate or butyl stearate, and even when the ratio of softener to resin in the composition is as three to ten.

I have discovered, however, that by mixing polymerized divinyl benzene with a raw drying oil such as raw linseed oil or raw China wood oil, I obtain perfectly clear films which become hard and tough in a short time and are much more flexible than films containing polymer or polymer and softener alone. These films, furthermore, have satisfactory durability.

My invention may be used in the preparation of clear lacquers, enamels, varnishes, or paints. In fact it can be used in practically all types of coating composition. The following examples illustrate coating compositions formed from divinyl benzene and raw linseed oil. It is to be understood that these compositions are merely illustrative and are not in any sense limitative.

*Example IV—Clear lacquer*

|                              | Per cent |
|------------------------------|----------|
| Polymerized divinyl benzene  | 20.37    |
| Raw linseed oil              | 12.22    |
| Cobalt oleate                | 0.47     |
| Toluene                      | 40.16    |
| Xylene                       | 26.78    |
|                              | 100.00   |

*Example V—White enamel*

|                              | Per cent |
|------------------------------|----------|
| Polymerized divinyl benzene  | 16.37    |
| Raw linseed oil              | 9.82     |
| Cobalt oleate                | 0.37     |
| Zinc oxide                   | 16.34    |
| Toluene                      | 34.26    |
| Xylene                       | 22.84    |
|                              | 100.00   |

Although divinyl benzene is compatible with raw drying oils, I have discovered that it is incompatible with heat-treated or blown linseed or China wood oil or with castor oil which is classed as a semi-drying oil.

The synthetic resin formed from the combination of polymerized divinyl benzene and a raw drying oil can be moulded under the influence of heat and pressure and is, therefore, useful as a plastic.

Among the advantages of this invention are the preparation of new compositions of matter, the preparation of coating compositions having excellent characteristics, and the preparation of a coating composition from polymerized divinyl benzene and a drying oil.

As many apparently widely different embodiments of this invention may be made without departing from the spirit and scope thereof, it is to be understood that I do not limit myself to the specific embodiments thereof except as defined in the appended claims.

I claim:

1. A new composition of matter comprising polymerized divinyl benzene and a raw drying oil.

2. A new composition of matter containing polymerized divinyl benzene which has been mixed with a raw drying oil.

3. A coating composition containing polymerized divinyl benzene and a raw drying oil.

4. A coating composition containing as the film-forming material a mixture of polymerized divinyl benzene with a raw drying oil.

5. A coating composition containing as the film-forming material polymerized divinyl benzene and raw linseed oil.

6. A coating composition containing as the film-forming material polymerized divinyl benzene and raw China wood oil.

In testimony whereof, I affix my signature.

HARRY B. DYKSTRA.